United States Patent [19]

Shafer

[11] 4,331,390

[45] May 25, 1982

[54] MONOCENTRIC OPTICAL SYSTEMS

[75] Inventor: David R. Shafer, Fairfield, Conn.

[73] Assignee: The Perkin-Elmer Corporation, Norwalk, Conn.

[21] Appl. No.: 82,814

[22] Filed: Oct. 9, 1979

[51] Int. Cl.$^3$ .............................................. G02B 17/00
[52] U.S. Cl. .................................................. 350/444
[58] Field of Search ................................. 350/442, 444

[56] References Cited

U.S. PATENT DOCUMENTS

| | | | |
|---|---|---|---|
| 2,571,657 | 10/1951 | Bennett | 350/444 |
| 2,785,604 | 3/1957 | Blaisse et al. | 350/444 |
| 3,326,621 | 6/1967 | De Nygorden | 350/444 X |
| 3,494,688 | 2/1970 | Rosin et al. | 350/444 |
| 3,748,015 | 7/1973 | Offner | 350/442 X |
| 3,748,020 | 7/1973 | Fischer et al. | 350/442 |

FOREIGN PATENT DOCUMENTS 1113637 9/1961 Fed. Rep. of Germany ...... 350/444

Primary Examiner—John K. Corbin
Assistant Examiner—Scott J. Sugarman
Attorney, Agent, or Firm—S. A. Giarratana; E. T. Grimes; T. P. Murphy

[57] ABSTRACT

The systems comprise a transmissive shell and a mirror. The surfaces of the shell and the mirror are monocentric; that is, spherical and have the same center of curvature. Both the object and image planes are located in front of and spaced away from the transmissive shell.

Single optical element systems comprise a transmissive shell with the mirror and the back surface of the shell being coincidence. These elements may be used as laser beam focusers, beam divergers and collimators.

Unit relay systems for use in super accurate microcircuit printing are disclosed. Parameters are given for a monochromatic diffraction limited f/2 system in the ultraviolet.

A single element monocentric catadiotric system is disclosed, which is corrected for 3rd and 5th order spherical aberration and all field aberrations except Petzval curvature. A two-element version can cover very wide fields of view with good performance at speeds as fast as f/0.6. More complicated designs are also discussed with correction for chromatic aberration and chromatic variation of aberrations. An unobscured 30° × 120° strip field design and an infra-red system are also disclosed.

7 Claims, 13 Drawing Figures

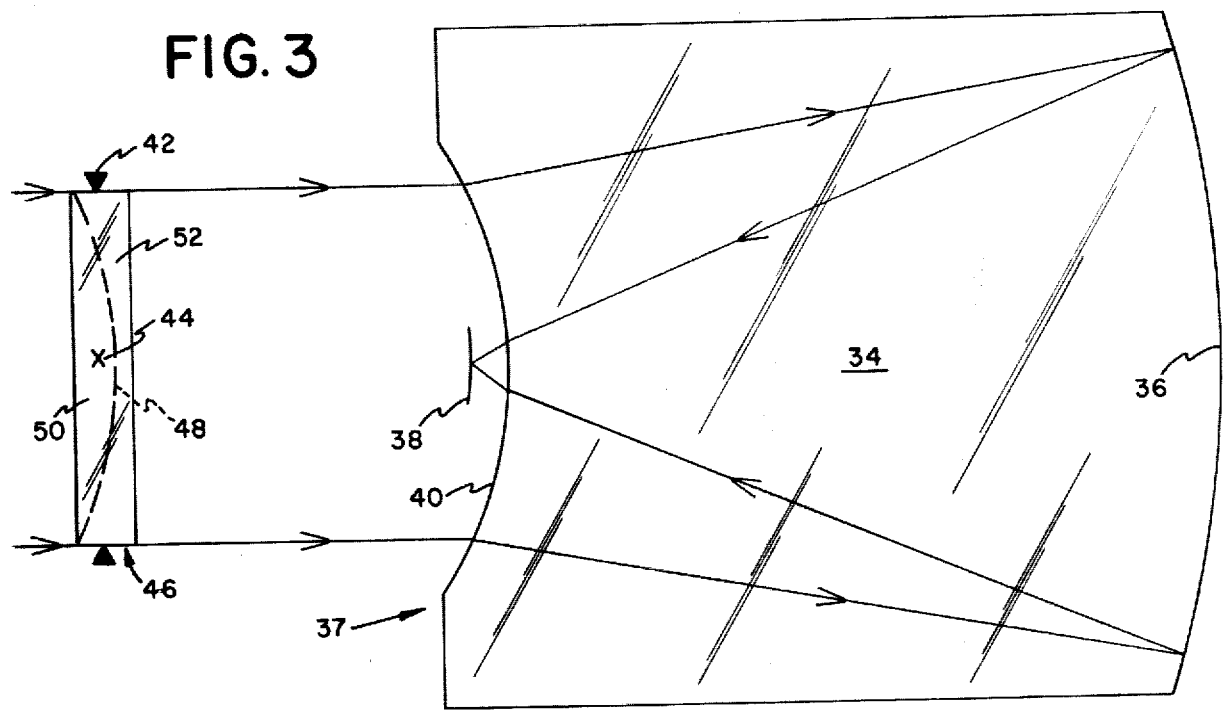
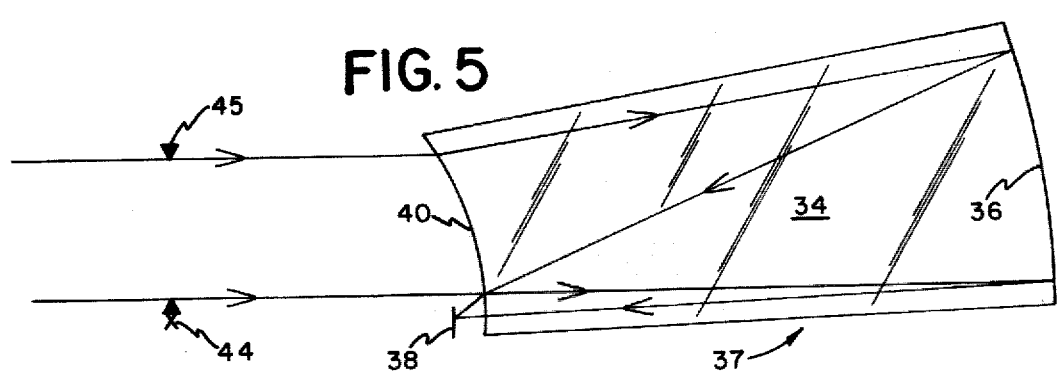
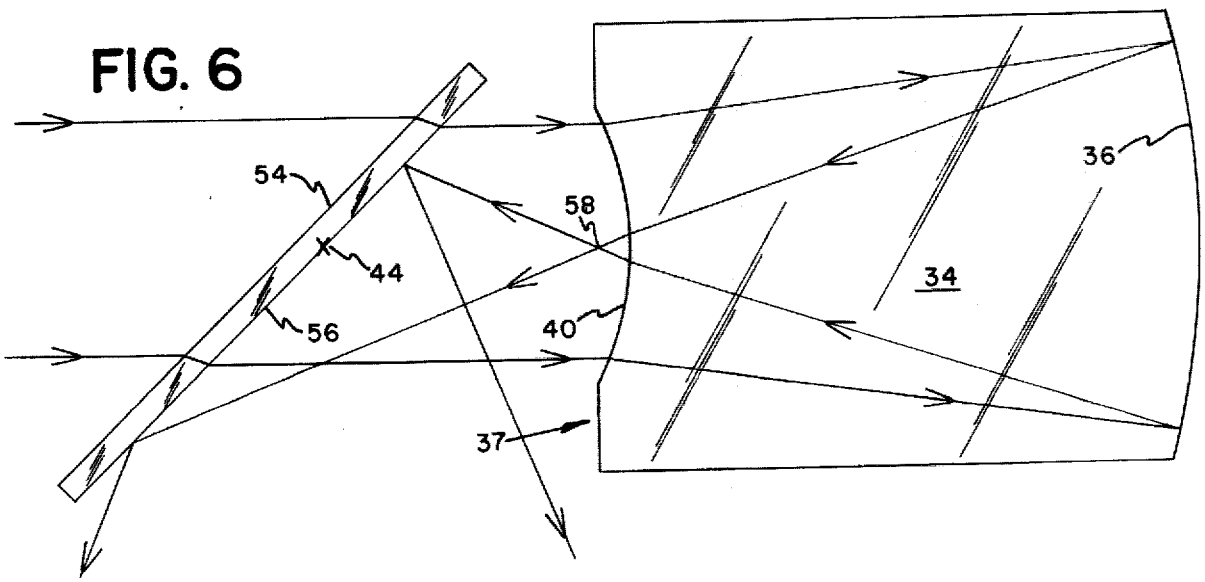

MONOCENTRIC OPTICAL SYSTEMS

TECHNICAL FIELD

This invention relates to monocentric optical systems and more particular it relates to such systems useful as laser beam focusers and divergers, catadiotric telescopes, collimators, telescopes without obscuration and unit magnification systems. The relay systems are characterized by unit magnification and full correction for any given object plane.

BACKGROUND ART

The Bouwers monocentric system shown in FIG. 1 is a well known design that can be corrected for 3rd order spherical aberration. This system comprises a spherical mirror 20, a concentric shell or lens 22 and an aperture stop 24. The surfaces 26 and 28 of the transmissive shell 22 and the mirror surface 20 are all concentric spheres having the same common center of curvature 30. Parallel light from a distant object is focussed upon an image plane 32 between the concentric shell 22 and the mirror 20.

The Bouwers system illustrated in FIG. 1 has no field aberrations except for Petzval curvature, that is the image 22 is curved. It is good for coverage of wide fields of view with uniform performance (assuming a curved image surface and an aperture stop 24 at the system center of curvature) and can work at relatively fast f-numbers. Monochromatic performance is limited by 5th order spherical aberration, which is reduced as the concentric lens is made thicker.

Monocentric relay systems having unit magnification comprising a primary and secondary concentric spherical mirror are utilized in the prior art to print from masters onto microcircuits. The object and image planes are located on equal distant sides of the common center of curvature. Such systems are sold for example under the trademark Micralign by Perkin-Elmer Corporation, assignee of this application. It is also known to place a concentric shell between the object and/or image and the reflector in these systems, the shell or shells being located between the object and the secondary mirror aligned with the center of curvature and the secondary.

DISCLOSURE OF THE INVENTION

I have discovered a whole family of optical systems characterized by being monocentric and having a transmissive shell located between the image plane and the primary in telescope and telescope-like situations and having the shell located between the primary and the secondary in unit magnification relay systems. It should be noted that the secondary in unit relay magnification systems is in fact located at the image if the system were used as a telescope and is characterized by double paths; that is, two reflections between the primary and the secondary rather than a single reflection between them. Thus, the shell is traversed four times.

OBJECTS OF THE INVENTION

It is therefore an object of the invention to provide improved monocentric optical systems.

Another object of the invention is to provide such optical systems enjoying an extremely high performance and correction for optical aberrations.

Still another object of the invention is to provide improved single element systems.

Yet another object of the invention is to provide such single element systems for use as laser beam focusers or divergers and collimators.

Yet another object of the invention is to provide improved catadiotric monocentric telescopes.

Still another object of the invention is to provide improved monocentric relay systems including those that can be used in the deep ultraviolet.

Other objects of the invention will in part be obvious and will in part appear hereinafter. The invention accordingly comprises the features of constructions, elements and arrangements of parts and articles of manufacture possessing the features, properties, and relations of elements, all of which will be exemplified in the articles and constructions hereinafter described. The scope of the invention will be indicated in the claims.

BRIEF DESCRIPTION OF DRAWINGS

For a fuller understanding of the nature and objects of the invention, reference should be had to the following detailed description taken in connection with the accompanying drawings in which:

FIG. 3 is a diagram of a system in which the monocentric element of FIG. 2 that has been corrected for longitudinal color and lateral color according to the invention.

FIG. 5 is a diagram of an unobscured laser beam focuser/diverger according to the invention.

FIG. 6 is a diagram of an f/1.2 laser beam diverger for optical testing according to the invention.

The same reference characters refer to the same elements throughout the several views of the drawings.

BEST MODE FOR CARRYING OUT THE INVENTION

Figure 1:
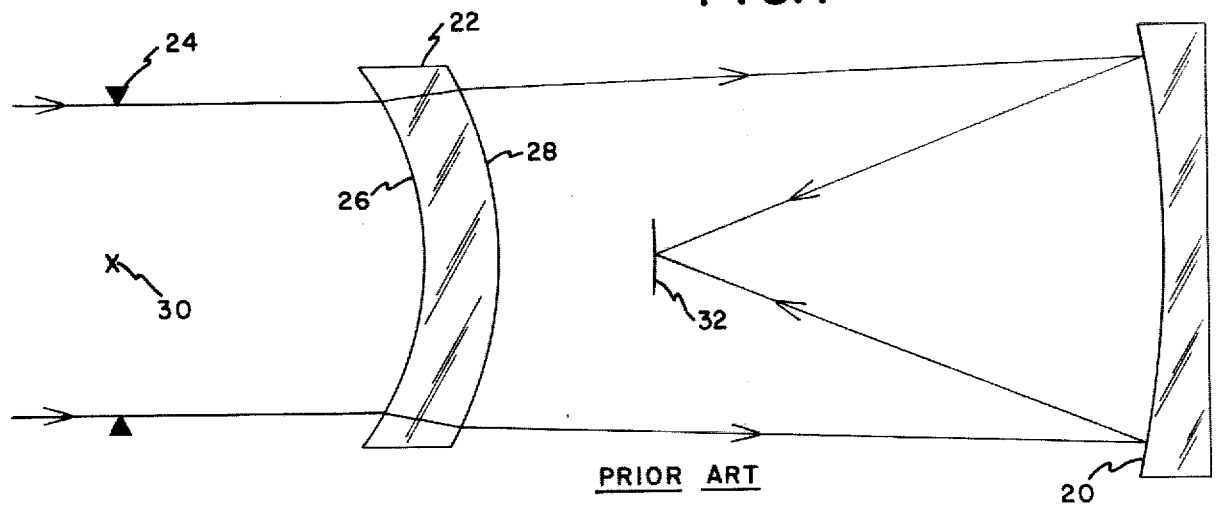
FIG. 1 is a diagram of a prior art Bouwers monocentric telescope.
Figure 2:
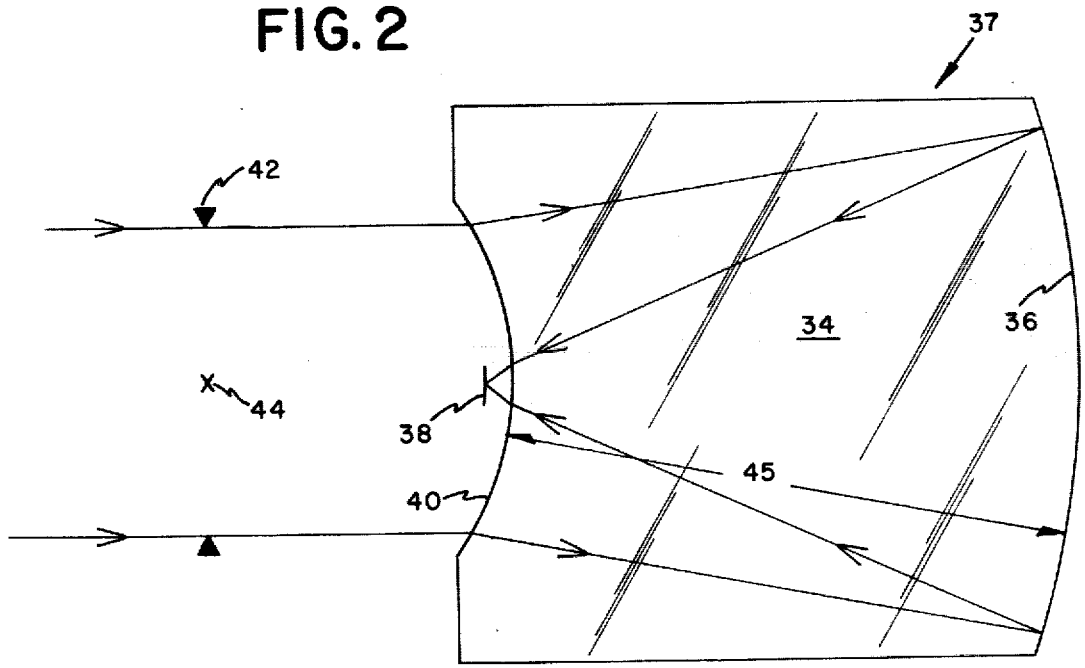
FIG. 2 is a diagram of an f/0.9 monocentric element according to the invention.

The extreme case of the invention is when the lens 34 completely fills all the space up to the mirror 36 to form a single monocentric element 37, as shown in FIG. 2. The aperture stop 42 is also located in the plane of the center of curvature 44. This is not just a thicker example of the FIG. 1 system, however. The FIG. 2 design according to the invention has glass on the way to the image 38, while the FIG. 1 design only has glass before the mirror and none afterward. This distinction is very important, for the FIG. 2 design can be made to have the image fall inside the glass, on the front surface, or in air out in front of the front surface (as shown) by choosing different lens thicknesses.

Only one choice will be corrected for 3rd order spherical aberration. Now it turns out that if the 3rd order spherical aberration could be corrected and the image position also independently changed, then 5th order spherical aberration could also be corrected. This is because the front surface 40 introduces very different amounts of higher order spherical aberration when the light goes through it for the second time, depending on whether the image falls inside, outside, or on that surface. The amount of 5th order spherical aberration of the system is quite sensitive to small changes in the image position 38 relative to the front surface 40.

It would seem that 3rd order spherical aberration and image position could not be simultaneously controlled in a single monocentric element, for the element thickness appears to be the only variable. Fortunately, the index of refraction of the element is a separate variable at our disposal, and is the key to this new design. It was found that if the index of refraction is n=1.445, then the FIG. 2 design will be corrected for both 3rd and 5th order spherical aberration for a particular element thickness, while the image will fall slightly outside the monocentric element 37, as shown. For any other value of the index, either 3rd or 5th order spherical aberration can be made zero, but not both.

Fused silica has very nearly that index of refraction value, and several plastics are also close. If we look at common glasses, Schott BK-7 glass is not nearly as close, but still gives relatively good aberration correction. It is a nice feature of the FIG. 2 system that the image f-number in air is about a factor of n faster than the f-number speed in the glass on the way to the image. This means that the design is diffraction limited at speeds near f/1.0 in small sizes, and makes a nice fast speed single element laser beam diverger for use in optical testing, laser interferometry, etc.

When fused silica is used, the monocentric element 37 of FIG. 2 may have a speed of f/0.9, plus or minus 1/20 of a wave front deformation at 0.6328 microns for a 2.5 centimeter focal length. This single element is not corrected for longitudinal color, although it has no lateral color for the aperture stop position shown. Parameters of the system of FIG. 2 for 50° field of view at f/0.6 are:

1st Surface 40

Radius = −6.000
Material 34 = fused silica, index = 1.457

2nd Surface 36

Radius = −16.9827
Material = same, reflecting
Thickness 45 = 10.9827
Distance between 1st surface 40 to image 38 = −0.6059
Aperture size = 6.000
System focal length = 5.3943

FIG. 3 shows how the longitudinal color can be corrected without disturbing the lateral color correction. A parallel plate 46 is positioned at the common center of curvature of the two surfaces. It clearly introduces no aberrations of any kind. A "buried surface" 48 is then added, as shown. Two glasses 50 and 52 having the same index of refraction for the central wavelength of the spectrum of interest, but different dispersions, are cemented together as a contact doublet lens. In this case the doublet is externally a parallel plate, and the "buried surface" 48 has no effect at the central wavelength. On either side of the central wavelength, the "buried surface" 48 has weak power and allows us to correct for the longitudinal color of the catadioptric system. Since the "buried surface" 48 is at the aperture stop 42 (and at the plane of the common center of curvature of the concentric surfaces), the resulting design is corrected for both longitudinal and lateral color. At the central wavelength, of course, the performance is identical to the FIG. 2 design.

By choosing the two glasses which make up the parallel plate very carefully, it is possible to also correct the spherochromatism of the catadioptric system at the same time as it is achromatized. Two glasses which do the job are Schott F-5 for element 50 and SK-2 of lower dispersion for element 52 as indicated in FIG. 3. The resulting design is then corrected for 3rd and 5th order spherical aberration, coma, and astigmatism, longitudinal and lateral color, and spherochromatism. Distortion is also corrected as is chromatic variation of distortion.

Figure 4:
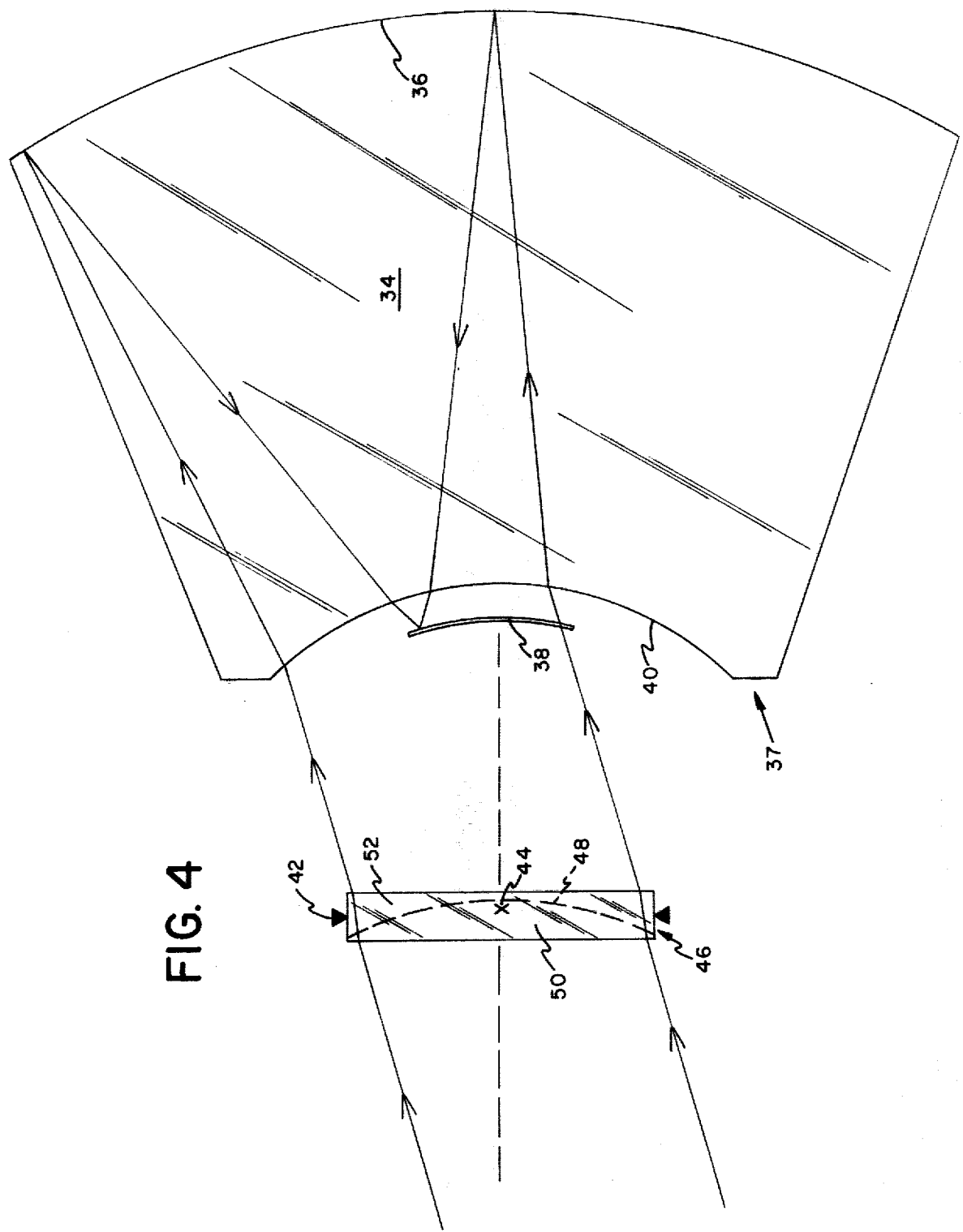
FIG. 4 is a diagram of a 30° field of view system according to the invention similar to FIG. 3 which may be used as a wide angle astrographic instrument.

FIG. 4 shows how a 30° f/1.0 system would look. Clearly the size of this system is limited by how large a piece of fused silica one can obtain. It would make a very nice U.V. sky survey camera or some other astrographic instrument where a wide-angle and high speed must be coupled with a broad spectrum. Of the 6 radii in the design, two are flat, two are concentric and two are matched (the buried surface 48) so it is an inexpensive design to make.

FIG. 5 shows an unobscured laser beam focuser/diverger with a speed of f/2. It is simply a piece of an f/0.9 FIG. 3 design. Since the element is monocentric, there is no unique optical axis and the design can also be regarded as an f/2 version of the FIG. 3 system that has been tilted until the image falls outside the entering beam. The aperture stop 45 located in the plane of the center of curvature 44 does not include it in the aperture. There is no coma or astigmatism, so we have a very tilt insensitive device. A 2.5 cm. focal length design of fused silica of the type shown in FIG. 5 has an output wavefront quality of ±τ/20 wave peak deformation at 0.6328 microns for an f/2 unobscured situation.

FIG. 6 shows another way to use the design of FIG. 3 so that the output is not heading back along the entering beam. A beamsplitter 54 half silvered on side 56 sends the diverging light off to one side after it passes through focus 58. This gives faster speeds than the FIG. 5 approach, which only can use one side of the aperture.

A single element of any index of refraction can be corrected for both 3rd and 5th order spherical aberration by departing slightly from the monocentric situation. The amount of departure will depend on how far the index is from the ideal value of n=1.445. For example, the FIG. 5 design can have its wavefront quality improved to about ±τ/150 peak deformation simply by not having the two radii be exactly concentric. The penalty for this performance improvement is that the design then has some coma and astigmatism, and becomes tilt sensitive. There is also a unique optical axis then, so that the FIG. 5 system cannot be obtained by simply tilting a FIG. 2 system until the image clears the entering beam. All other systems are strictly monocentric, as that is the key to wide angle performance.

Figure 7:
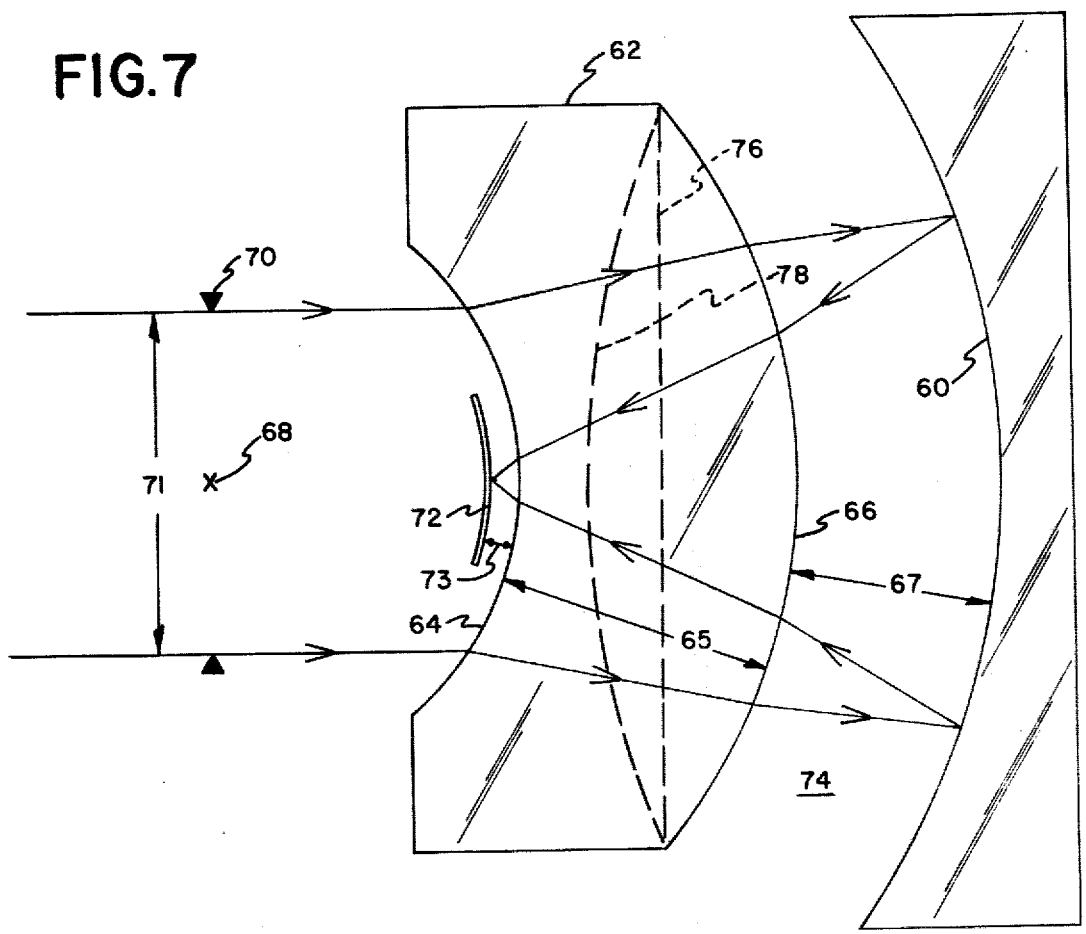
FIG. 7 is a diagram of a monocentric 35° field of view f/0.8 telescope according to the invention.

By splitting the single element into two, it is possible to independently control both 3rd and 5th order spherical aberration with any index of refraction, as shown in FIG. 7. The telescope of FIG. 7 comprises a mirror 60 separated from a shell lens 62, the front surface 64 and back surface 66 and the mirror 60 are all concentric about center of curvature 68. Aperture stop 70 is provided in the plane of the center of curvature 68 and the image 72 is spaced away from the front surface of the shell 62.

The airspace 74 between the lens 62 and the mirror 60 allows very fast f-number designs to be diffraction limited. The system of FIG. 7 is an f/0.8 system using BK-7 which covers a 35° field of view with 80% of the energy within a 1.8 arc second diameter spot size. The image causes a 25% area obscuration that is constant over the field of view. If this system is made with a 10 cm aperture size, the wavefront quality is $\pm \tau/20$ at 0.6328 microns. Since 7th order spherical aberration limits the performance, the wavefront quality for an optimized design goes with the 8th power of the aperture. The design clearly has much better monochromatic performance at speeds of f/1.0 or slower than could ever be used.

An optimized design for the system of FIG. 7 has the following parameters:

First element 62

First surface 64 Radius = −10.0000
Thickness 65 = 8.8354
Material = Schott BK-7 glass, Index = 1.5168
Second surface 66 Radius = −18.8354
Separation 67 to 2nd element 60 = 6.7330

Second element 60

Radius = −25.5684
Reflecting
Image distance 73 from 1st surface = −0.9243
Aperture diameter 71 = 11.0000
System focal length = 9.0755

The design illustrated in FIG. 7 may be achromatized for chromatic variation of astigmatism and chromatic variation of Petzval curvature by converting the shell 62 into a doublet having either a flat or a curved contact face as indicated at 76 and 78 respectively, the two glasses forming the doublet having the same index of refraction but different dispersions. The double convex or planoconvex lens has the higher dispersion.

Figure 8:
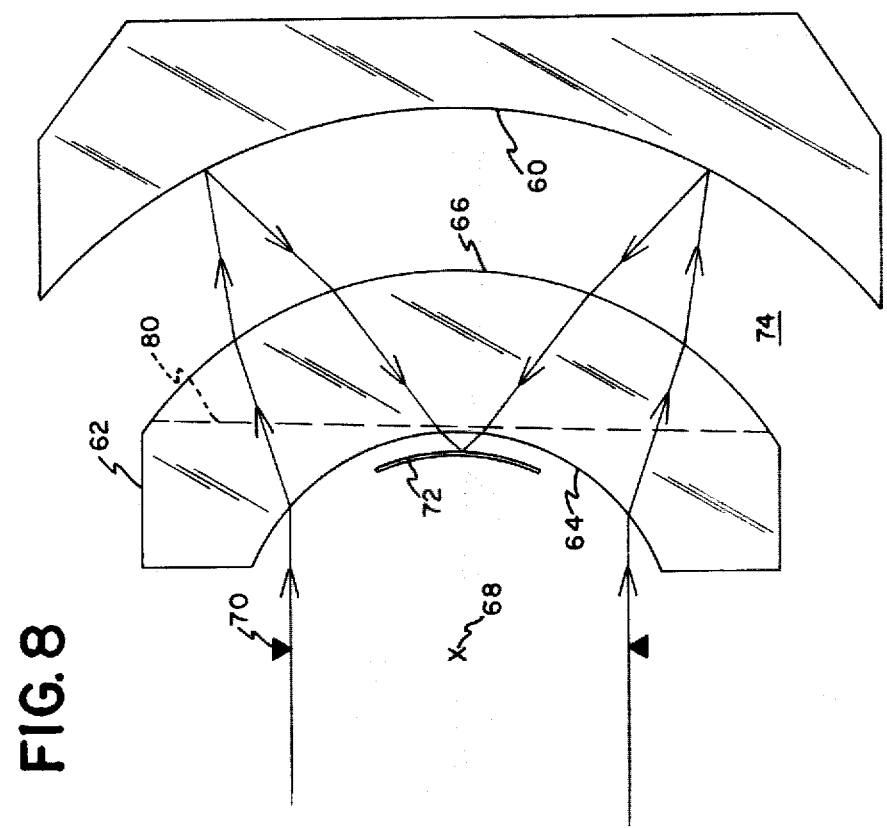
FIG. 8 is a diagram of a 50° f/0.6 monocentric telescope according to the invention.

It turns out that at faster speeds, the best balance between the lower orders of spherical aberration and the higher orders is obtained by making the lens progressively thinner. FIG. 8 (drawn to scale as is FIG. 7) shows an optimized design for a speed of f/0.6 that has a substantially thinner lens than the f/0.8 design of FIG. 7. The design of FIG. 8 may be achromatized for chromatic variation of astigmatism and Petzval curvature by converting element 62 to a doublet as indicated at interface 80. This system using BK-7 covers a 50° field of view with an area obscuration of 25%. Both this design and the FIG. 7 design are shown with element sizes large enough so that there is no vignetting over the field of view. Both the FIG. 7 and the FIG. 8 designs have substantially the same performance—80% of the energy falls within a spot diameter of 30 arc seconds over the whole field of view. The cone angle of the light from an f/0.6 system is +60°, so the depth of focus is quite small.

Figure 9:
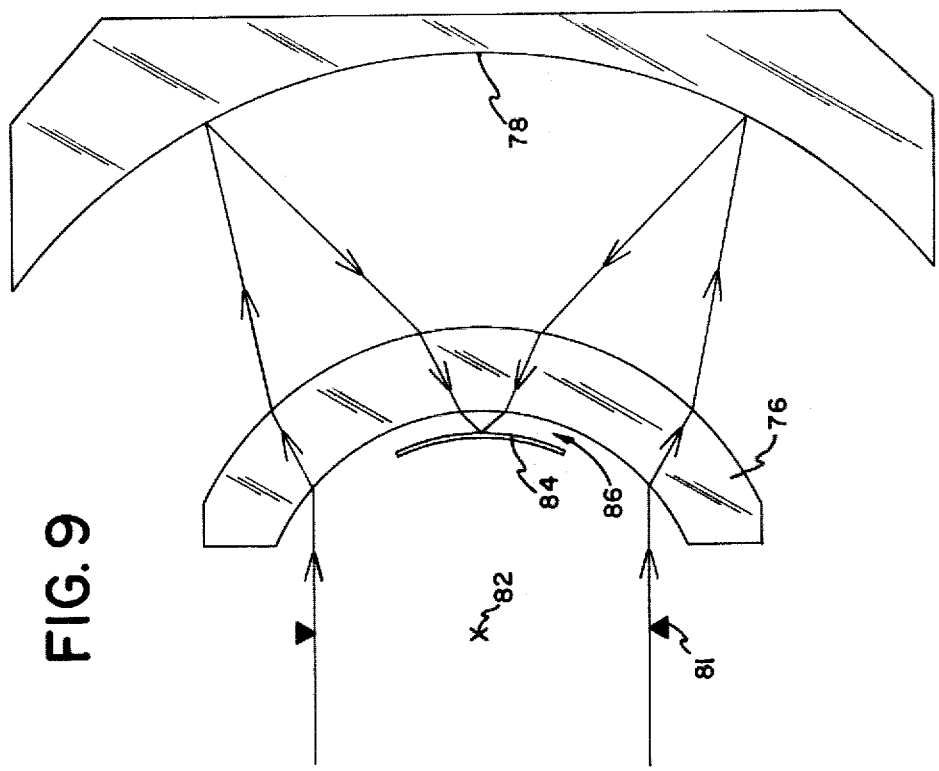
FIG. 9 is a diagram of a 50° field of view f/0.6 monocentric telescope according to the invention using zinc selenide for the shell-like lens.

FIG. 9 is an f/0.6 design with the same field of view (50°) where the lens 76 is zinc selenide. This system for use in infrared also employs a primary mirror 78 and an aperture stop 80 located in the plane of the center of curvature 82. An infrared detector (not shown) may be placed at the image 84. One must keep in mind that however tempting it might be to place the detector against the front surface of the lens, which is more convenient than at the image 84, the whole key to the high performance of these designs is the airspace 86 between the lens and the image.

Figure 10:
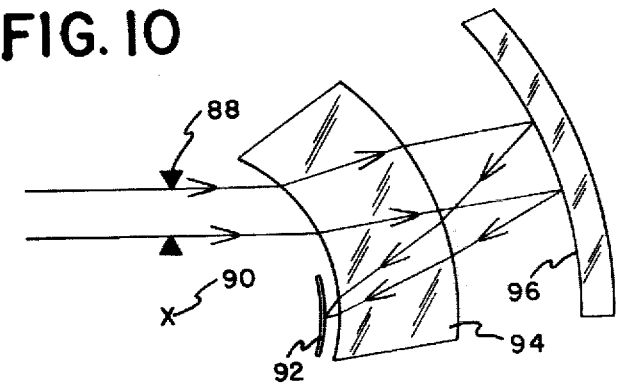
FIG. 10 is a cross-sectional diagrammatic side view of an unobscured 30°×120° system according to the invention.
Figure 11:
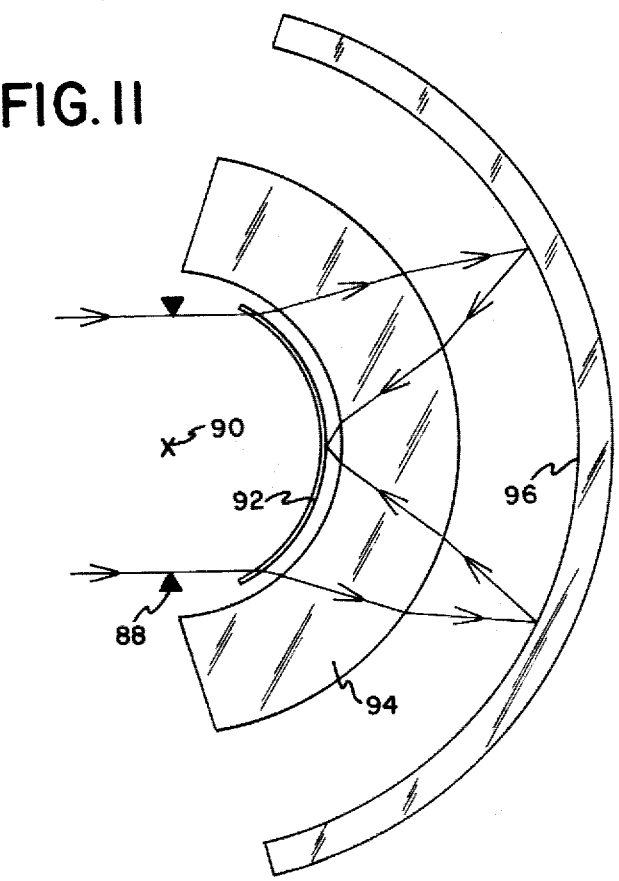
FIG. 11 is a cross-sectional diagrammatic top view of the system shown in FIG. 10.

An unobscured 30°×120° system is shown in FIGS. 10 and 11. A rectangular shaped aperture seen from the side in FIG. 10 and from the top in FIG. 11 gives an effective speed of f/1.5. Three such systems would give coverage of the whole 360° horizon with 30° elevation angle coverage as well.

The rectangular aperture stop 88 is located in the plane of the curvature 90 but as shown in FIG. 10 does not include the center of curvature 90 in the aperture. Thus, the rectangular image 92 provided by the BK-7 shelf 94 and reflector 96 is not obscured.

Figure 12:
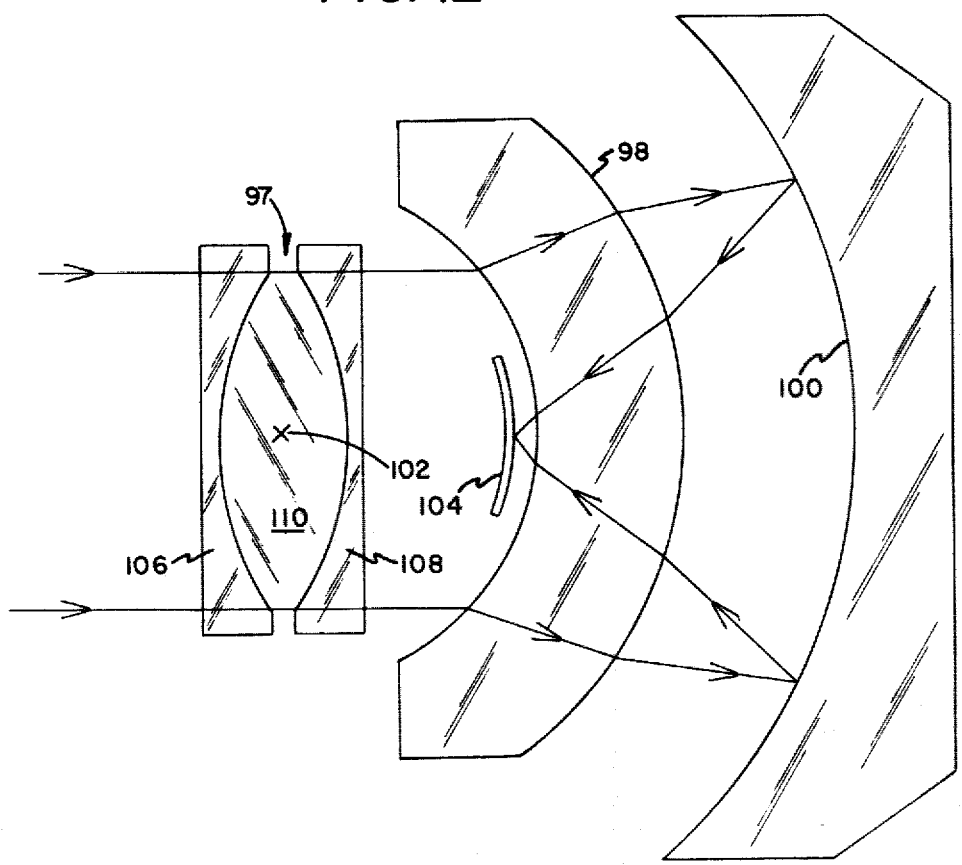
FIG. 12 is a diagram of a 50° field of view f/0.6 telescope with broad spectral correction according to the invention.

Broad spectral performance can be achieved by correcting the above designs for longitudinal color and spherochromatism. There are no other chromatic aberrations in a monocentric system. Bouwers designs such as that shown in FIG. 1 are often achromatized by adding a "buried surface" inside the lens, so that it becomes a cemented doublet and the same technique is shown in dotted lines in FIGS. 7 and 8. This introduces lateral color, however, so that wide angle performance is compromised for broad spectral regions. The way around this is to put a zero power achromatising lens 97 at the center of curvature 102 of the system, as shown in FIG. 12. The system of FIG. 12 comprises the usual shell lens 98 and mirror 100 having spherical surfaces concentric about center of curvature 102 providing an image 104 spaced in front of the shell 98. A doublet could be used, but a triplet has a nice feature that will be discussed shortly. The triplet 97 is a parallel plate with two buried surfaces. Two glasses are used, one for the planoconcave lenses 106 and 107 and another for the biconvex lens 110. At the central wavelength of interest, the two glasses used in triplet 97 have the same index of refraction, and the triplet looks like a simple parallel plate. It has no effect on the light going through it, and does not change the performance of the monocentric part of the design. At other wavelengths, the different dispersions of the two glasses—lens 110 being more dispersive than lenses 106 and 108—cause the triplet to have net power, in order to compensate for the chromatic aberration of the monocentric part. Since the triplet is at the aperture stop, and at the center of curvature of the monocentric part, the system does not have any lateral color.

Spherochromatism can be corrected by choosing the ratios of the two glass dispersions carefully. A large dispersion difference makes the buried curves steep in the achromatising triplet 97, and gives a lot of spherochromatism, while a small dispersion difference has the opposite effect. Careful glass choice allows correction of both chromatic aberration and spherochromatism. This can also be done with a doublet parallel plate as in FIG. 3. The point of the triplet is that its symmetry makes it corrected for chromatic variation of coma, while the doublet is not. The FIG. 12 design only has chromatic variation of astigmatism, solely in the triplet, and chromatic variation of Petzval curvature.

A variety of telescope designs have been discussed which are based on the monocentric optical system of the invention. These all have extremely good correction at fast f-number speeds. Many interesting uses are possible for these systems, which have performance levels normally achievable only by the use of aspherics or several more elements. Of course, even higher performance levels can be achieved by putting a higher order asperhic at the center of curvature of these systems, such as on the triplet 97 in FIG. 9 or the doublets 50 in FIGS. 3 and 4. A nice feature of all the designs is that there is no glass right up near the image—the back focus distance is large enough so that there is no glass right up near the image, and dust or pits and scratches on the lens surface will not be in focus at the image.

Figure 13:
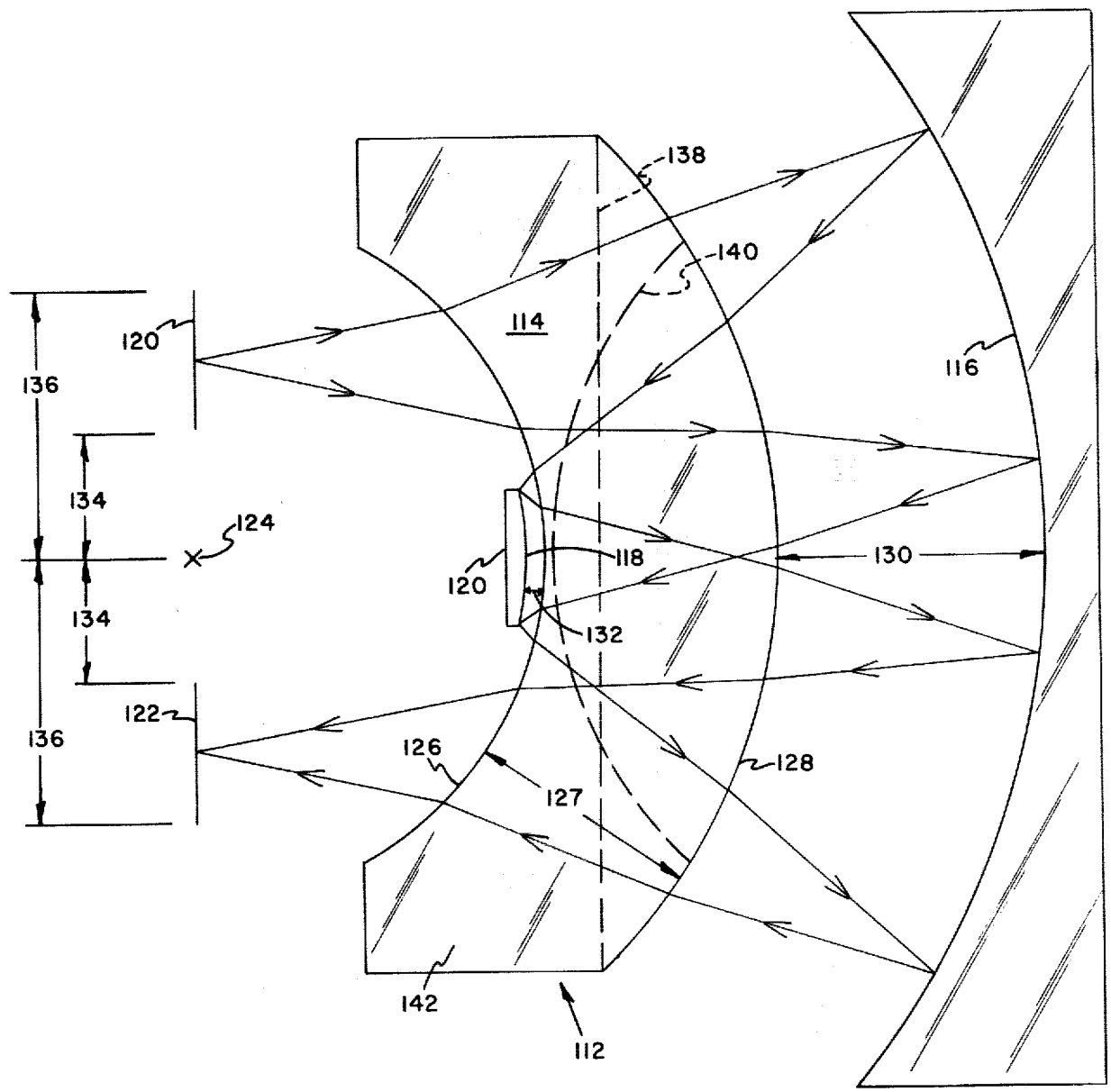
FIG. 13 is a cross-sectional view of a monocentric unit magnification relay system according to the invention.

Now referring to FIG. 13, there is shown a unit magnification relay system generally indicated at 112 for use in printing onto microcircuit chips. We have our usual transmissive shell 114 and primary mirror 116. If that were all, the system in FIG. 13, drawn to scale, would be a telescope with an image at 118. In fact, the system of FIG. 13 can be designed as a telescope and then by placing a mirror holder 120 with its mirrored surface coincident with the image 118, we have a unit magnification system which is diffraction limited for a 1"×1" object at +12.5. It turns out that optimum correction occurs if the object and image are at 120 and 122 or vice versa in the plane of the center of curvature 124.

The system achieves a much wider field of view than is otherwise obtainable without the shell 114 or with shells located between the mirror 118 and the center of curvature 124.

A feature of this design which distinguishes it from the prior art is that the shell 114 is traversed four times, in going to and from the secondary mirror, and in going to and from the object and image to the primary mirror. Another feature is that the secondary mirror 118 is not on the front face of the shell. Neither of these conditions alone is sufficient to provide the high performance of this design. Both are necessary.

In this system it is possible to have only 9th and higher order aberrations. Monochromatically, there are no 3rd, 5th, or 7th order aberrations. In the design shown, however, lower order aberrations are made nonzero to balance out the 9th and higher orders.

The design has no axial or lateral colors but it does have chromatic variation of astigmatism and Petzval curvature which makes it best suited for monochromatic situations.

One of the features of the design is that it is well corrected at all conjugate distances, however, the 7th order aberrations are only corrected when the object and image planes are in the center of curvature.

The elements may be defined for a diffraction limited system at 0.6328 microns f/2 as follows:

1st Element

Front surface 126 radius = −2.5000
Thickness 127 = 0.9665
Index of Refraction = 1.5000 (fused silica in ultraviolet region)
Back surface 128 radius = −3.4665
Airspace 130 to primary mirror = 2.2446

Primary Mirror

Radius = −5.7111

Secondary Mirror

Radius = −2.3697
Spacing 132 from front of first element 114 = −0.1303

The object and image planes 120 and 122 are coincidence with the plane of the center of curvature. The regions of diffraction limited image quality as measured from the center of curvature 134 and 136 are 1.78 for the distance 134 and 2.10 for the distance 136.

It should be noted that a feature of the system of FIG. 13 is that, if used as a telescope, the image 118 is a sphere concentric with the center of curvature 124 and this is true for all of the images of monocentric systems according to my invention.

Although the 7th order aberrations are only corrected when the objects and images 120 and 122 are in the plane of the center of curvature 124, only the 7th order aberrations are introduced by moving them towards or away from the system so the system is relatively insensitive to mechanical misalignment.

In systems for use with a wide spectral range, the shell 114 may be made into a doublet by means of a buried surface such as shown in dotted lines at 138 or 140. The planoconvex or double convex lens thus formed has the higher dispersion but the same index of refraction as the other portion 142 of the shell 114 as in the design shown in FIGS. 7 and 8. In fact the two elements forming the doublet may be separated by an air space in order to increase the number of parameters that are useful for optimization.

Although the relay system of FIG. 13 is simplest when the shell 114 is a single element, it can also be split into multiple concentric shells if that should prove desirable for any reason. As long as it stays a monocentric design, there will be more than enough design parameters to achieve high performance. If large enough refractive shells are not easily obtainable for some large scale example of the invention, it may be split into two or more thinner concentric shells. There may also be occasions when it is mechanically advantageous, or thermally so, to split the shell into two or more concentric pieces. The key requirement is that the mirror 118 be separated from the nearest shell. One skilled in the art and familiar with the new design principles set forth here could easily design such multiple shell embodiments of the invention.

It will thus be seen that the objects set forth above, among those made apparent from the preceding description, are efficiently attained and, since certain changes may be made in the above described articles and constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An optical system, comprising:
    a concave mirror,
    a convex mirror,
    a transmission shell disposed between said mirrors so that a beam of light entering said optical system traverses said transmissive shell at least four times before leaving said optical system, the surfaces of said mirrors and said transmissive shell having the same center of curvature.

2. The optical system defined in claim 1 wherein said transmissive shell has a buried surface therein dividing it into two elements, one of positive and one of negative power, the element of positive power having higher dispersion than the element of negative power.

3. The optical system defined in claim 2 wherein said elements of negative and positive power have substantially the same index of refraction.

4. The optical system defined in claim 1 wherein said shell is fused silica.

5. The optical system defined in claim 1 and:

(G) an object and an image, both in the plane of the center of curvature, said object and image being spaced away from the center of curvature.

6. The optical system defined in claim 1 wherein said shell has an index of 1.5000, the radius of the front surface of said shell is −2.5000, the radius of the back surface thereof is −3.4665, the thickness thereof 0.9665, the space between said back surface and said mirror is 2.2446, the radius of said mirror is −5.711, the radius of the convex mirror at the image is −2.3697, the space between said first surface and said convex mirror is −0.1303, and the object and image are spaced laterally from the center of curvature from 1.78 to 2.10.

7. The optical system defined in claim 1 wherein said shell is divided into at least two elements having identical facing surfaces.

* * * * *